Dec. 3, 1968  J. L. KLEIN ET AL  3,413,707
METHOD OF PREPARATION OF FIBERS HAVING HIGH ASPECT RATIOS
Filed May 10, 1967
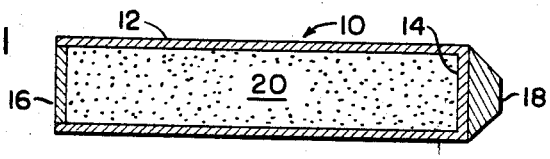
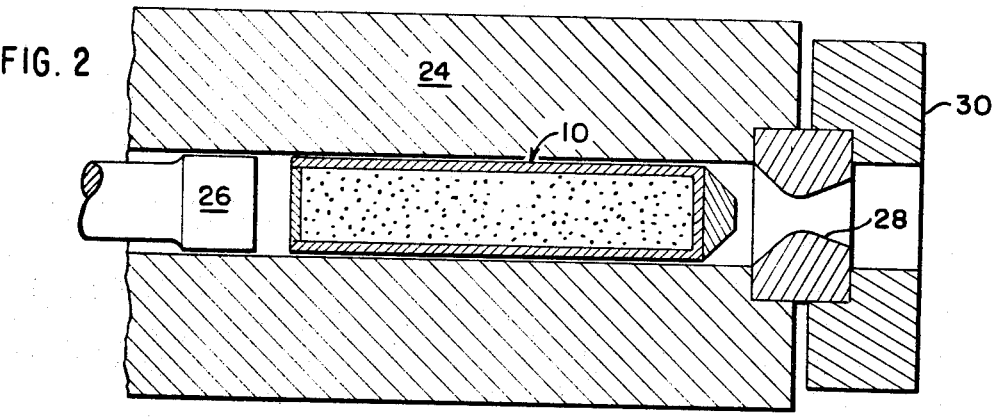
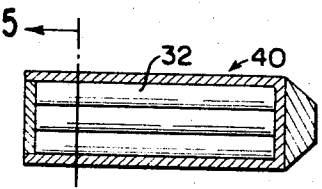  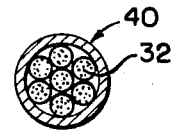
INVENTORS
CHARLES H. ZENUK
JOSEPH L. KLEIN
BY
Kenway, Jenney & Hildreth
ATTORNEYS

United States Patent Office

3,413,707
Patented Dec. 3, 1968

3,413,707
METHOD OF PREPARATION OF FIBERS HAVING HIGH ASPECT RATIOS
Joseph L. Klein, Harvard, and Charles H. Zenuk, South Acton, Mass., assignors to Whittaker Corporation, Los Angeles, Calif., a corporation of California
Filed May 10, 1967, Ser. No. 637,468
8 Claims. (Cl. 29—419)

ABSTRACT OF THE DISCLOSURE

A method of preparing elongated fibers from a relatively stiff material such as beryllium is described. The fibers are characterized by extremely high aspect ratios and are formed by mechanically mixing particles of the material to be fibered with particles of a second material which will serve as a ductile matrix for the fibers and extruding the resultant mixture at an elevated temperature to form an extended metallic bar. The bar is then segmented and the segmented portions are repacked and reextruded at least one additional time. The fibers embedded in the resultant metallic bar are recovered by etching away the ductile matrix with an appropriate acid.

BACKGROUND OF THE INVENTION

Fibrous material is frequently used in applications requiring a relatively large surface area per unit of volume or weight. One illustration of such an application is the use of fine, thin fibers of certain materials as catalyzing agents to promote chemical reactions, the large surface area of the fibers permitting an increased reactivity between the catalytic material and the materials whose reactivity is being promoted. Another illustration is the use of fibrous material as strengthening elements.

Ductile materials are readily formed into fibers or filaments by drawing or by repeated extrusion. Processes of this type, however, are both tedious and time consuming and require an excessive number of hand operations to achieve fibers which have even a moderately high aspect ratio. Further, such processes are generally not suitable for use with stiffer, more refractory materials such as beryllium which are characterized by relatively high extrusion constants.

SUMMARY OF THE INVENTION

We have found that elongated fibers having extremely high aspect ratios may be formed from relatively stiff material by mechanically mixing particles of the material to be formed into fibers with particles of one or more materials which ultimately form a ductile matrix for the fibers, packing the resultant mixture into an extrusion cannister, and extruding the mixture at a high temperature and at a relatively large reduction ratio to form a solid extruded bar having a fiber network of a first material extending throughout a ductile matrix of the second material.

The extruded bar is then cut at intervals along its longitudinal axis to form smaller bar segments. These segments are reassembled within an extrusion cannister, the longitudinal axes of the segments being disposed in parallel, and the cannister is extruded to form a new extended metallic bar in which the previously extruded fibers have been greatly lengthened and narrowed so as to form fibers of extremely high aspect ratio. If desired, the process of segmenting the bar and reextruding may again be repeated to form fibers of even higher aspect ratio. The resultant fibers are then recovered by etching away the ductile matrix.

Accordingly, it is an object of our invention to provide a method of preparing elongated fibers having relatively high aspect ratios. Another object of our invention is to provide a method of preparing elongated fibers of a relatively stiff material such as beryllium in which the fibers are characterized by extremely high aspect ratios.

One feature of our invention resides in the formation of such fibers from an initially particulate mixture. Another feature of our invention resides in the utilization of an extrusion process for forming the fibers.

SPECIFICATION

The above and other and further objects and features of our invention will be more readily understood by reference to the following detailed description of the accompanying drawings in which:

FIG. 1 is a side sectional view of an extrusion cannister showing the particulate materials mechanically mixed and compressed within the cannister;

FIG. 2 is a diagrammatic view of an extrusion press showing the cannister in position for extrusion;

FIG. 3 is a pictorial view, partly in section, showing the formation of fibers within the resultant extruded bar;

FIG. 4 is a side elevational view of an extrusion cannister with portions broken away to show the positioning of the extruded rod segments of FIG. 3 for further extrusion;

FIG. 5 is a cross-sectional view along the lines 5—5 of FIG. 4; and

FIG. 6 is a pictorial view, partly in section, of an extruded bar showing the increased elongation of the fibers.

Referring now to FIG. 1 in more detail, there is shown an extrusion cannister 10 of cylindrical shape having a side wall 12, an end wall 14 which may be formed integral with the side wall 12, and an end wall 16 which is welded or otherwise firmly joined to the cannister when the latter has been filled and prepared for extrusion. A solid guide element 18, in the form of a truncated cone, may be firmly attached to the end wall 14 by welding or other means. The cannister 10, and its associated guide element 18, may advantageously be formed of copper or other material, the guide element serving the dual function of guiding the cannister into the extrusion die and lubricating the pressure bearing surfaces of the die as will be seen in more detail below.

A particulate mixture 20 is tightly packed within the extrusion cannister 10. The mixture 20 is formed from at least two particulate materials, the first of which is a relatively stiff material which is to be formed into fibers and the second of which is a more ductile material which will form a matrix for carrying the resultant fibers. The relative percentages of the materials which are to be mixed will be in part dependent on the particular materials being used. For the extrusion of beryllium in a copper-nickel mixture, mixtures having on the order of 10–20 volume percent beryllium were found to be advantageous. In general, the material to be fibered should occupy less than about 30 volume percent of the mixture although with special precautions such as precoating of this material this percentage can be raised to 50% or higher. The particulate materials may be in the form of a relatively fine powder or in the form of metallic shot particles of very small diameter, preferably not larger than about 600 microns (approximately 28 mesh).

It is desirable that the two materials be blended in a relatively uniform, intimate mixture before packing in the extrusion cannister in order that the particles of the material to be fibered do not form clusters which would prevent the formation of fine fibers within the mixture. In order to accomplish this, the starting materials may be dry blended in a mechanical blender before being packed into the extrusion cannister. The mixture should be thoroughly compacted within the cannister to prevent subsequent separation. In many cases it will be found advantageous to mix the particulate materials with a fluid such as methanol to provide a mechanical mixture having a putty-like consistency; if the mixture is then packed into the extrusion cannister under mechanical pressure from a hydraulic jack, it will be found that particles of like material retain the desired separation. Excess liquid incorporated in the mixture may be squeezed from the mixture while compacting it within the cannister. Any additional excess liquid remaining in the mixture after it is compacted may be removed by heating the cannister, evacuating it, and sealing it under vacuum. When using copper-nickel materials in the process, it may be found desirable to flush the mixture with hydrogen before sealing in order to reduce any oxides that may be present.

After the cannister has been appropriately prepared, it is placed in an extrusion press as shown in FIG. 2 which is a diagrammatic view of an illustrative extrusion press showing the cannister in position for extrusion. As seen from FIG. 2, the press comprises a container 24 having a central bore for guiding a ram 26 against the cannister 10; a liner may, of course, be interposed between the cannister and the container in accordance with conventional extrusion practice if desired. The ram, which is operated by an external power source such as a hydraulic piston (not shown), forces the cannister through an extrusion die 28 which is maintained in position on the bed of the extrusion press by means of a die backer 30.

The extrusion ratio (ratio of the cross-sectional area of the cannister and contents to the cross-sectional area of the extrusion die opening) which is chosen for the extrusion is dependent upon the materials which are to be extruded and on elongation which is desired. In order to obtain a high yield of individual fibers of relatively high aspect ratio (ratio of length to diameter) with the minimum number of extrusions, it is desired that this extrusion ratio be relatively high (of the order of 10 or more) although lesser ratios may, of course, be utilized.

To assist in the extrusion process, the cannister is preferably extruded at an elevated temperature; for example, when beryllium fibers are to be formed in a copper matrix, the extrusion is performed at temperatures of 800 to 900° F. The remaining extrusion variables, such as the extrusion force and extrusion speed, are dependent on the types of materials being extruded and on the extrusion ratio. For the extrusion of beryllium in copper using an extrusion die of approximately ¼ inch in diameter operating at a 16:1 extrusion ratio, an extrusion force of approximately 90 tons was utilized at an extrusion speed of 33 inches per minute.

After being forced through the extrusion die, the cannister and the compacted powder within assume the form of a narrowed and extended billet as shown in FIG. 3. The stiffer particulate material assumes the form of discrete fibers 34 which extend in a generally longitudinal direction throughout the billet, while the more ductile material appears in the form of a continuous solid matrix 36 in which the fibers are embedded. The length of the cannister has been increased by a factor of R during the extrusion, while its diameter has been decreased by a factor of $\sqrt{R}$, so that its aspect ratio has been increased by a factor of $R\sqrt{R}$. The aspect ratio of the fibers has been correspondingly increased, as compared to the aspect ratio of the starting particulate material.

The next step in the process is to prepare the billet 32 of FIG. 3 for reextrusion. To accomplish this, the billet is cut into smaller segments, and the resultant segments are packed into an extrusion cannister 40 as shown in FIG. 4 which is a side elevational view of an extrusion cannister with portions broken away. The billet segments are packed in a generally close packed configuration as shown in FIG. 5, which is a cross-sectional view along the lines 5—5 of FIG. 4. The purpose of this particular method of packing is to fill the extrusion cannister in such a manner as to minimize the void space within it.

The cannister 40 is prepared for extrusion in the same way as was the cannister 10 although, of course, steps directed to the removal of liquid from the cannister before sealing may be omitted. The cannister is then fed to an extrusion press and extruded into a billet 42 as shown in FIG. 6, which is a pictorial view of the billet, with sections partly broken away, showing the extended length of the fibers developed during the second extrusion. The length of the fibers 44 has again been increased by a factor of R while the diameter of the fibers has been decreased by a factor of $\sqrt{R}$, so that the aspect ratio of the fibers has again been increased by a factor of $R\sqrt{R}$. For example, for an extrusion ratio of 10, the aspect ratio is increased by a factor of 1000 after two extrusions.

Fibers of even higher aspect ratio may, of course, be formed by repeating the previously-described steps of segmenting the extruded bar, recanning it and reextruding it. However, during each extrusion, the materials being extruded react with each other to some extent, the specific amount being dependent on the extrusion ratio and the number of extrusions to which the material is subjected. This reaction places an upper limit on the increase in aspect ratio which may be obtained by repeated extrusions. For those materials which react strongly with the matrix in which they are being formed, it is preferable to obtain the desired increase in aspect ratio by utilizing a small number of extrusions at a high extrusion ratio.

After the desired increase in aspect ratio has been obtained by repeated extrusion, the fibers of the stiffer material are recovered from the extruded billet by etching away the ductile matrix by means of a suitable etchant. For a copper matrix, or a copper-nickel alloy matrix, a solution of nitric acid in distilled water is appropriate as an etchant.

Instead of using a mixture of only two materials, it is often desirable to utilize a mixture of three or more initially particulate materials. In such cases, one of these materials forms the embedded fibers while the other materials alloy with each other to form the disposable matrix. This provides great flexibility in choosing the material which is to form the disposable matrix and allows a close matching of the extrusion constants of the matrix and of the material to be fibered. An illustration of a mixture of this type is described in detail in Example 2 below.

A clearer understanding of the advantageous results obtainable with the method described above may be obtained from the following examples:

EXAMPLE 1

15 volume percent beryllium shot sized to −48+60 mesh was mixed with a Cu-15% Ni alloy in the form of finely divided shot. The particulate materials were mechanically blended, transferred to an extrusion cannister, and hand compacted to minimize separation of the starting materials. The cannister was then closed, evacuated and sealed, and extruded at 900° F. on a 300-ton extrusion press at an extrusion pressure of approximately 90 tons per square inch, a speed of 33 inches per minute, and an extrusion ratio of 16:1. The resultant billet was cut into approximately 3″ lengths, packed in an extrusion cannister and reextruded at a temperature of 800° F.; this process was repeated a third time.

The beryllium fibers embedded in the Cu-15% Ni matrix were extracted by treating the resultant billet with a 2:1 solution of nitric acid in distilled water. The first extrusion yielded fibers approximately ¼″ in length, while the second extrusion yielded fibers from 1 to 2″ in length; after the third extrusion, few long continuous fibers of beryllium remained, due to the reaction between the beryllium and the Cu-15% Ni matrix. The departure of the expected length of fibers from the expected length is attributed to fiber-fiber interaction due to an initially incomplete mixture of the starting materials.

EXAMPLE 2

A mixture of 10 volume percent beryllium shot sized to −48+60 mesh was mixed with approximately 64 volume percent copper and 26 volume percent nickel, both sized to −325 mesh powder. The starting materials were blended with methanol to provide a putty-like consistency and the resultant blend hydraulically packed in an extrusion cannister. The cannister was closed, evacuated to one micron, heated to 300° F. under vacuum and flushed with hydrogen to reduce oxides, and evacuated three times before sealing off at 0.1 micron at room temperature. The cannister was heated to 800° F. and extruded under a pressure of approximately 30 tons per square inch at an extrusion speed of 11 inches per minute. The resultant billet was cut into 3″ segments, canned, and reextruded, the process being repeated a third time. The beryllium fibers were extracted from the matrix with a 2:1 solution of nitric acid in distilled water. Beryllium fibers of approximately ⅛″ in length were obtained from the first extrusion, while fibers in excess of the length of the metallographic specimen (¾″) were obtained from the second extrusion. A slight amount of interaction between the beryllium and the copper-nickel matrix was observed in the second extrusion; this reaction was quite pronounced in the third extrusion.

From the above it will be seen that a mixture of initially particulate starting materials is readily transformed into a ductile matrix in which a large number of elongated fibers of extremely high aspect ratio has been formed, the fibers being recoverable from the matrix by treating it with a suitable etchant. Our method of preparing these fibers is thus both simple and economical and allows the aspect ratio of the fibers to be controlled by controlling the extrusion ratio and the number of extrusions. Further, our method permits the incorporation of a number of different materials into the mixture to be extruded, thus allowing the extrusion to be performed under conditions which are most advantageous to the material being formed into fibers.

Having described and illustrated a preferred embodiment of our invention, what we claim is new and desire to secure by Letters Patent is:

1. A method of preparing elongated fibers having a high aspect ratio comprising the steps of
   (a) mechanically mixing a first particulate material which is to be formed into fibers with a second particulate material which is to form a disposable matrix for the fibers,
   (b) tightly compacting the resulting mixture into an extrusion cannister and sealing the cannister,
   (c) forcing the cannister through an extrusion die at an elevated temperature whereby the particulate materials are formed into an extended solid bar segment of reduced cross-sectional area in which the first particulate material assumes a fibrous form extending generally in the direction of the longitudinal axis of the bar and embedded in a continuous matrix of said second particulate material,
   (d) repacking a plurality of bar segments into an extrusion cannister, the longitudinal axes of the bar segments being aligned in parallel within said cannister,
   (e) sealing said cannister and extruding it at an elevated temperature to form a second extended solid bar segment having a plurality of axially extending fibers of said first material embedded therein, the steps of packing, sealing, and reextruding the previously formed solid bar segments being performed at least once, and
   (f) extracting the fibers from the bar segments by etching away the matrix in which the fibers are embedded.

2. The combination defined in claim 1 in which said first material is a relatively stiff material and in which said second material is a relatively ductile material.

3. The combination defined in claim 2 in which said first material is beryllium, the particles of said material having a maximum size of 600 microns.

4. The combination defined in claim 3 in which said second material is copper.

5. The combination defined in claim 3 in which said second material is formed from a copper-nickel mixture.

6. The combination defined in claim 1 in which said materials are blended with a liquid during mixing to form a viscous mass of putty-like consistency, excess liquid being forced from said viscous mass when said mass is forced into said cannister, whereby a substantially uniform distribution of said particles in said mass may be obtained.

7. The combination defined in claim 1 in which said first particulate material occupies less than 30 volume percent of said mixture.

8. The combination defined in claim 1 in which said second particulate material comprises a mixture of at least two distinct particulate materials which form a continuous, solid matrix for said fibers.

References Cited

UNITED STATES PATENTS

| | | | |
|---|---|---|---|
| 2,050,298 | 8/1936 | Everett | 29—423 X |
| 3,029,496 | 5/1962 | Levi | 29—419 X |
| 3,218,693 | 11/1965 | Allen et al. | 29—599 |
| 3,277,564 | 10/1966 | Webber et al. | 29—419 |

JOHN F. CAMPBELL, *Primary Examiner.*

PAUL M. COHEN, *Assistant Examiner.*